United States Patent
Brewer et al.

(10) Patent No.: US 7,702,681 B2
(45) Date of Patent: Apr. 20, 2010

(54) QUERY-BY-IMAGE SEARCH AND RETRIEVAL SYSTEM

(75) Inventors: Brett D. Brewer, Sammamish, WA (US); Eric B. Watson, Redmond, WA (US); Randall J. Macbeth, Edmonds, WA (US); Nicholas A. Whyte, Mercer Island, WA (US)

(73) Assignee: Microsoft Corporation, Redmond, WA (US)

(*) Notice: Subject to any disclaimer, the term of this patent is extended or adjusted under 35 U.S.C. 154(b) by 875 days.

(21) Appl. No.: 11/170,267

(22) Filed: Jun. 29, 2005

(65) Prior Publication Data

US 2007/0005571 A1    Jan. 4, 2007

(51) Int. Cl.
*G06F 17/30* (2006.01)
(52) U.S. Cl. .............. 707/748; 715/230; 382/181; 707/780; 707/944
(58) Field of Classification Search .............. 707/3, 707/5, 6, 104.1; 715/230; 382/181
See application file for complete search history.

(56) References Cited

U.S. PATENT DOCUMENTS

| | | | | |
|---|---|---|---|---|
| 4,143,956 A * | 3/1979 | Miyagawa | .............. | 396/318 |
| 6,629,104 B1 * | 9/2003 | Parulski et al. | .............. | 707/102 |
| 6,741,977 B1 * | 5/2004 | Nagaya et al. | .............. | 707/1 |
| 6,950,519 B2 * | 9/2005 | Rhoads | .............. | 713/176 |
| 7,028,253 B1 * | 4/2006 | Lieberman et al. | .............. | 707/4 |
| 2003/0039410 A1 * | 2/2003 | Beeman et al. | .............. | 707/3 |
| 2003/0195883 A1 * | 10/2003 | Mojsilovic et al. | .............. | 707/6 |
| 2004/0267740 A1 * | 12/2004 | Liu et al. | .............. | 707/3 |
| 2005/0196016 A1 * | 9/2005 | Sato et al. | .............. | 707/3 |
| 2007/0198182 A1 * | 8/2007 | Singh | .............. | 701/211 |

* cited by examiner

*Primary Examiner*—Hosain T Alam
*Assistant Examiner*—Jieying Tang
(74) *Attorney, Agent, or Firm*—Shook, Hardy & Bacon LLP

(57) ABSTRACT

An image query system, and associated method and computer program product are disclosed that enhance and accelerate image-based querying. To this end, the present invention presents a digital image query with implict and explicit associated metadata and retrieval of visually similar images or other pertinent information from a large collection of images stored on local, networked, or web-linked repositories.

10 Claims, 4 Drawing Sheets

QUERY-BY-IMAGE SEARCH AND RETRIEVAL SYSTEM

TECHNICAL FIELD

The present invention relates generally to a method, system, and computer program product that enable a query-by-image search, and more specifically, to a method, system, and computer program product that enable a query-by-image search with associated implicit or explicit metadata for navigation through a set of similar objects and the identification of objects that meet query criteria.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. The vastness of the unstructured WWW causes users to rely primarily on Internet search engines to retrieve information or to locate businesses. These search engines use various means to determine the relevance of a user-defined search to the information retrieved.

Typically, each search result rendered by the search engine includes a list of individual entries that have been identified by the search engine as satisfying the user's search expression. Each entry or "hit" includes a hyperlink that points to a Uniform Resource Locator (URL) location or web page. In addition to the hyperlink, certain search result pages include a short summary or abstract that describes the content of the web page.

A common technique for accessing textual materials on the Internet is by means of a "keyword" combination, generally with Boolean operators between the words or terms, where the user enters a query comprised of an alphanumeric search expression or keywords. In response to the query, the search engine sifts through available web sites to match the words of the search query to words in a metadata repository, in order to locate the requested information.

This word-match based search engine parses the metadata repository to locate a match by comparing the words of the query to indexed words of documents in the repository. If there is a word match between the query and words of one or more documents, the search engine identifies those documents and returns the search results in the form of HTML pages.

Furthermore, not only is the quantity of the WWW material increasing, but the types of digitized material are also increasing. For example, it is possible to store alphanumeric texts, data, audio recordings, pictures, photographs, drawings, images, video and prints as various types of digitized data. However, such large quantities of materials are of little value unless the desired information is readily queryable, browseable and retrievable. While certain techniques have been developed for accessing specific types of textual materials, these techniques are at best moderately adequate for accessing graphic or other specialized materials. Consequently, there are large bodies of published materials that still remain significantly underutilized.

As a result, it is becoming increasingly important to enable users to search by content and context, and not be limited to textual searches.

SUMMARY OF THE INVENTION

The present invention is directed to an image query system, and associated method and computer program product (collectively referred to herein as "the present system") that enhance and accelerate image-based querying. To this end, the present invention presents a digital image query with implict and explicit associated metadata and retrieval of visually similar images or other pertinent information from a large collection of images stored on local, networked, or web-linked repositories.

The present system allows individuals to take or use digital pictures and attach both implicit and explicit data with the image so that the data will accompany the picture in the query. If it is sent through the Internet or any other medium, the accompanying text, or, additionally, an audio file, is always associated with the digital picture.

The annotated material that is attached to the picture will be queryable, browseable and retrievable such that as the image is incorporated in a database, the implicit and explicit data will be useful in locating relevant images or information. For example, if textual material, such as the location of a photograph is added to the digital photograph, a query by image for an object at the same location would result in a match for the search Furthermore, if a number of images are acquired by the database relevant to a particular event, e.g., news event, users can conduct image query or textual searches for all of the photographs submitted by for a certain event, or on a certain subject, or by location, or by the date of the picture. The combination that could be searched would vary with the type of material stored in the file.

It would now become possible based upon the present invention to make each picture into a separate database suppository of data that describes attributes about that picture, and when joined together with many other photograph tagged pictures, it becomes possible to build a database of pictures, where each picture has information describing the contents of the picture. Thus, when joined with many other pictures, this will form a database of pictures that can be searched and processed as a group or as individual pictures.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
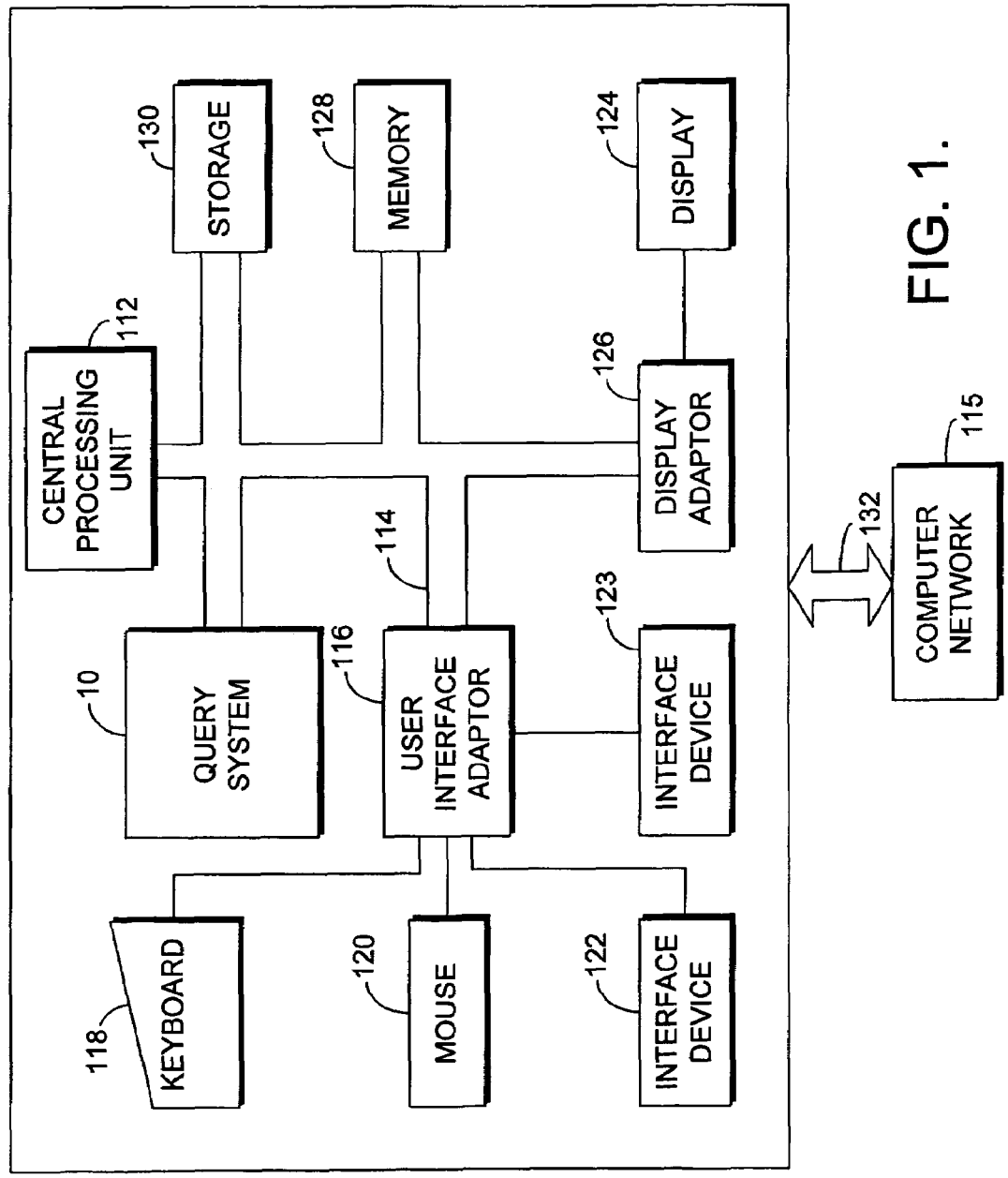
FIG. 1 is a high level block diagram of a computer workstation environment in which a query-by-image system of the present invention may be implemented.

FIG. 1 illustrates a representative computer workstation 110 in which a query-by-image system 10 of the present invention may be practiced. A digital image is selected for the query and is inputted to the computer workstation 110 by a cellular phone, digital camera, a scanner, or downloaded from the Internet or another computer. The workstation 110 can be, for example, a personal computer (PC) that is connected to a plurality of peripheral devices. Furthermore, it is noted that the workstation 110 could also be a camera or mobile phone. Typically, the workstation 110 includes a central processing unit (CPU) 112 and a bus 114 employed to connect and to enable communication between the central processing unit 112 and the other components of the workstation 110.

The workstation 110 further may include a user interface adaptor 116 that connects the central processing unit 112 via the bus 114 to one or more interface devices, such as a keyboard 118, a mouse 120, and/or other interface devices 122, 123, such as a touch screen, a digitized pad, and so forth. The bus 114 also connects a display device 124, such as a monitor or a liquid crystal display (LCD) screen, to the central processing unit 112 via a display adaptor 126. The bus 114 also connects the central processing unit 112 to a memory 128 and a storage device 130 such as a hard drive, diskette drive, tape drive, etc.

The digital picture is transferred to the memory 128 of the first workstation 110 by any conventional means such as physically loading a disk into the hard drive or by wired or wireless communication between the camera and the memory.

System 10 includes a software programming code or computer program product that may be embodied on any of a variety of known media for use with a data processing system, such as a diskette, hard drive, or CD-ROM.

The code may be distributed on such media, or may be distributed to users from the memory or storage of one computer system over a network of some type to other computer systems for use by users of such other systems. Alternatively, the programming code may be embodied in a memory, and accessed by a central processing unit. The techniques and methods for embodying software programming code in memory, on physical media, and/or distributing software code via networks are well known and will not be further discussed herein.

Figure 2:
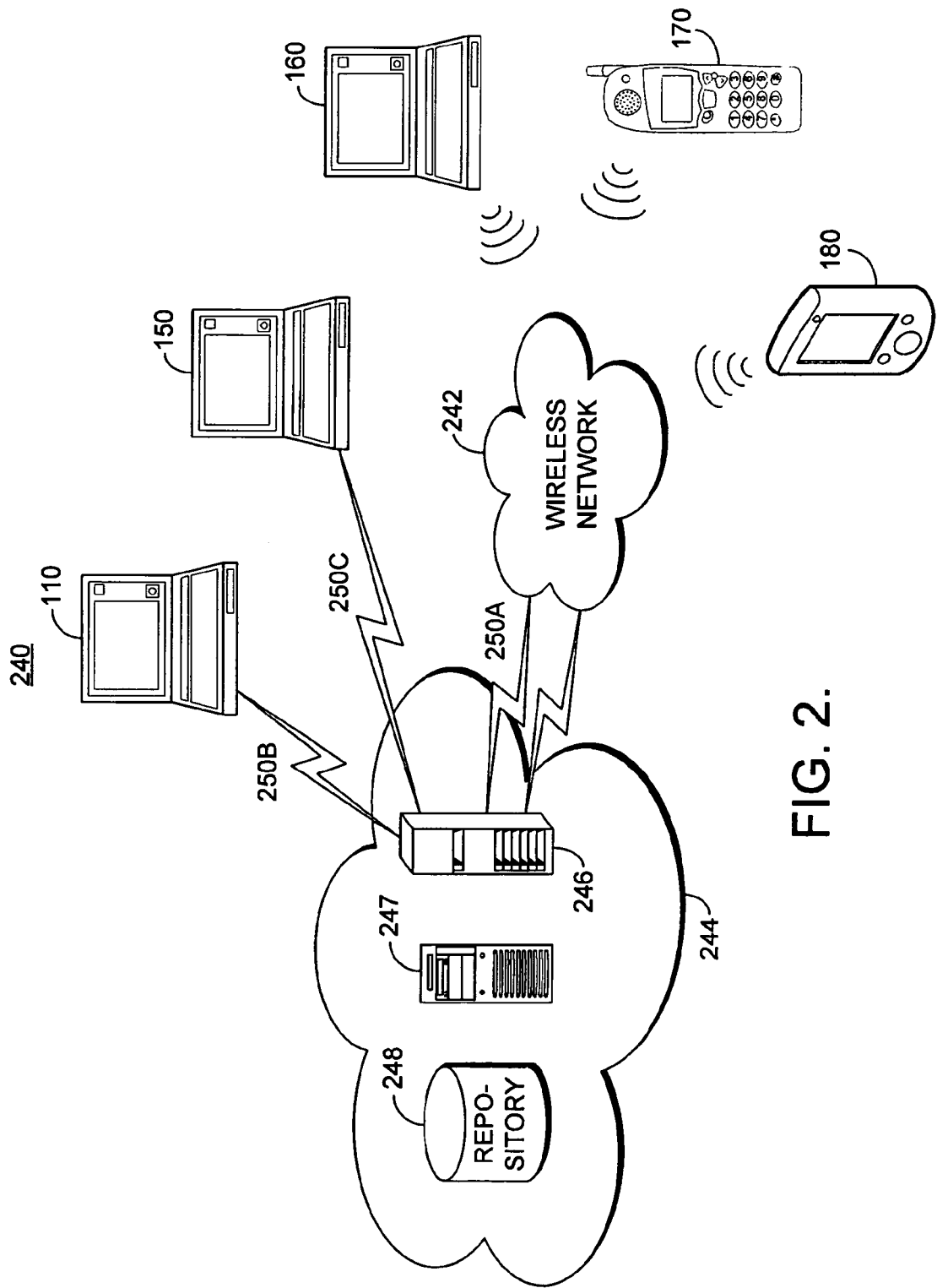
FIG. 2 illustrates an exemplary networked computing environment in which the workstation and the query system of FIG. 1 may be used.

In an alternative embodiment, system 10 includes a software or computer program product that is modular and that may be embedded within, or installed on workstation 110 or on a host server 247 (FIG. 2).

The workstation 110 may communicate with other computers or networks of computers 115, for example via a communications channel or modem 132. Alternatively, the workstation 110 may communicate using a wireless interface, such as a cellular digital packet data (CDPD) card. The workstation 110 may be associated with such other computers in a Local Area Network (LAN) or a Wide Area Network (WAN). The workstation 110 can also be a client in a client/server arrangement with another computer.

The system 10 further comprises a database with a potentially large collection of candidate images and associated information pertinent to the image. A purpose of the system is to retrieve from the collection one or more images and associated information that match the image query. The system performs a search in the collection of the images based both on the content of an image used as the search and on the basis of implicit and explicit metadata annotated to the image. The system has ranking criteria that will display the most relevant results.

Referring now to FIG. 2, it illustrates a data processing network 240 in which the present visual query system 10 may be practiced. The network 240 includes, for example, a plurality of networks, such as a wireless network 242 and the Internet 244, each of which may connect a plurality of individual workstations, such as workstations 110, 150, 160, 170, 180. Additionally, one or more Local Area Networks (LANs) may be included, where a Local Area Network may comprise a plurality of intelligent workstations coupled to a host processor.

The networks 242 and 244 may also include mainframe computers or servers, such as a gateway 246 or application server 247 that accesses a data repository 248, using Transmission Control Protocol/Internet Protocol (TCP/IP) connection. The gateway 246 serves as a point of entry into each network 244. The gateway 246 may be coupled to another network 242 by means of a communications link 250A. The gateway 246 may also be directly coupled to one or more workstations 110, 150, using communications links 250B, 250C, respectively.

The gateway 246 may be distant from the network 242, and similarly, the workstations 110, 150, 160, 170, 180 may be located remotely from the networks 242 and 244. The workstation 110 may be connected to the wireless network 242 using a networking protocol, such as the TCP/IP, over a number of alternative connection media, such as cellular phone networks, radio frequency networks, satellite networks, etc.

The wireless network 242 is connected to the gateway 246 using a network connection 250A such as Transmission Control Protocol or User Datagram Protocol (UDP) over Internet Protocol, X.25, Frame Relay, Integrated Services Digital Network (ISDN), Public Switched Telephone Network (PSTN), and so forth. The workstation 110 may alternatively be connected directly to the gateway 246 using a dial up connection. Further, the networks 242 and 244 may be connected to one or more other networks (not shown), in an analogous manner to that depicted in FIG. 2.

In use, a user's computer, i.e., 160 may be connected to a server (or gateway) 246 embodying the query-by-image system 10 using a wired connection or a wireless connection. Wired connections are those that use physical media such as cables and telephone lines, whereas wireless connections use media such as satellite links, radio frequency waves, and infrared waves. Many connection techniques can be employed with these various media, such as: using the computer's modem to establish a connection over a telephone line; using a Local Area Network card such as Token Ring or Ethernet; using a cellular modem to establish a wireless connection, etc. The user's computer 160 may be any type of computer processor, including laptop, handheld or mobile computers; vehicle-mounted devices; desktop computers; mainframe computers; etc., having processing and communication capabilities. The remote server 246 can similarly be one of many computer types with processing and communication capabilities.

Figure 3:
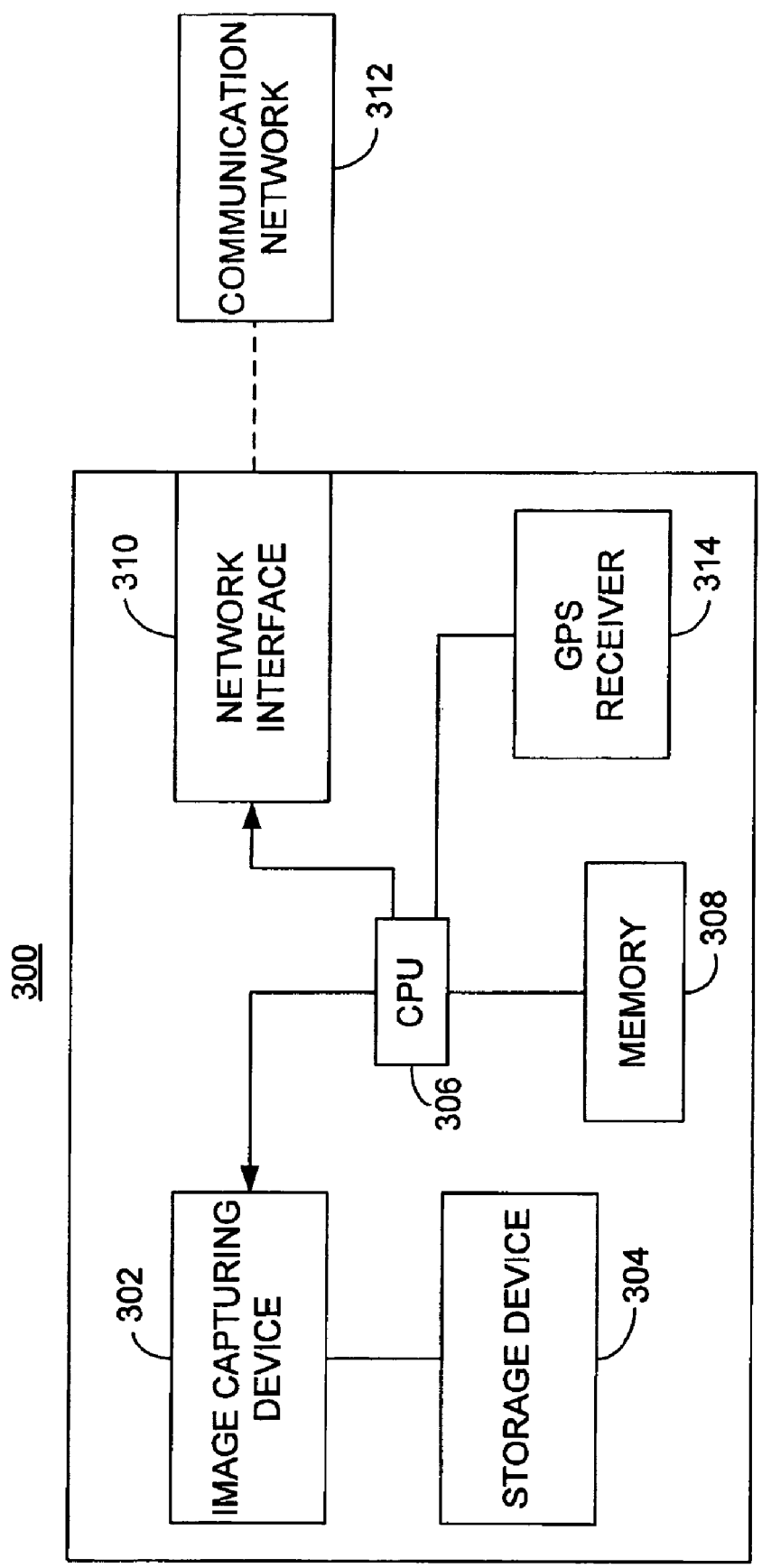
FIG. 3 is a high level block diagram of a camera or camera phone environment in which the query by image search system of the present invention may be implemented.

FIG. 3 broadly illustrates the operation features 300 of a standard digital camera 10 (or digital camera phone). These features include an image capturing device 302 for capturing an image as well as a storage device 304 for storing one or more images in a digital format. A CPU 306 controls the operation of the digital camera in concert with a memory 308. The information contained in the storage device 304 is then introduced to a network interface 310 for the purpose of transmitting the digital image or images to a communications network 312 such as the Internet or any other type of wired or wireless communication.

The camera 300 may attach implicit data, such as date and time stamps, to the image. Further, camera 300 may likewise include automatic image geocoding to attach GPS localization, or for camera phones, GSM localization, to the image. The automatic image geocoding may be done through a GPS receiver plug-in 314. The date, time and GPS/GSM stamps are permanent, non-modifiable, intrinsic information that is attached as pixels into a digital picture.

Textual attributes may be annotated to the image to allow for organization and location of images from a database. Further, additional information may be associated with the image through anchor text or alternate text. Through known information extraction techniques, this data can be extracted from the annotated text or anchor text and used for searching various items in the image database 248. It is important to note that this data is not limited to textual data and may also include sound data. This is important since the searching capacities of the present invention would then not be limited to just textual data but would also include the possibility of searching the audio data. Various input devices associated with the present invention such as voice recognition devices can be employed in this searching process.

An image data tag application is loaded into the memory of the workstation 110, such as a camera, camera phone or any other memory device. This data application enables a user to input image-related data such that an image may be tagged with the associated information. This annotated data is easily accessible by system 10 so that the annotated material may be used both for the location of relevant documents and the categorization of the image for future searches.

The present system 10 thus enables a query-by-image search that includes implicit and/or explicit metadata annotated thereto in such a manner that both the data and the photograph are stored as one file. The entire file thus can be transferred from one memory device such as a first workstation 110 to a second memory device such as server 246.

Figure 4:
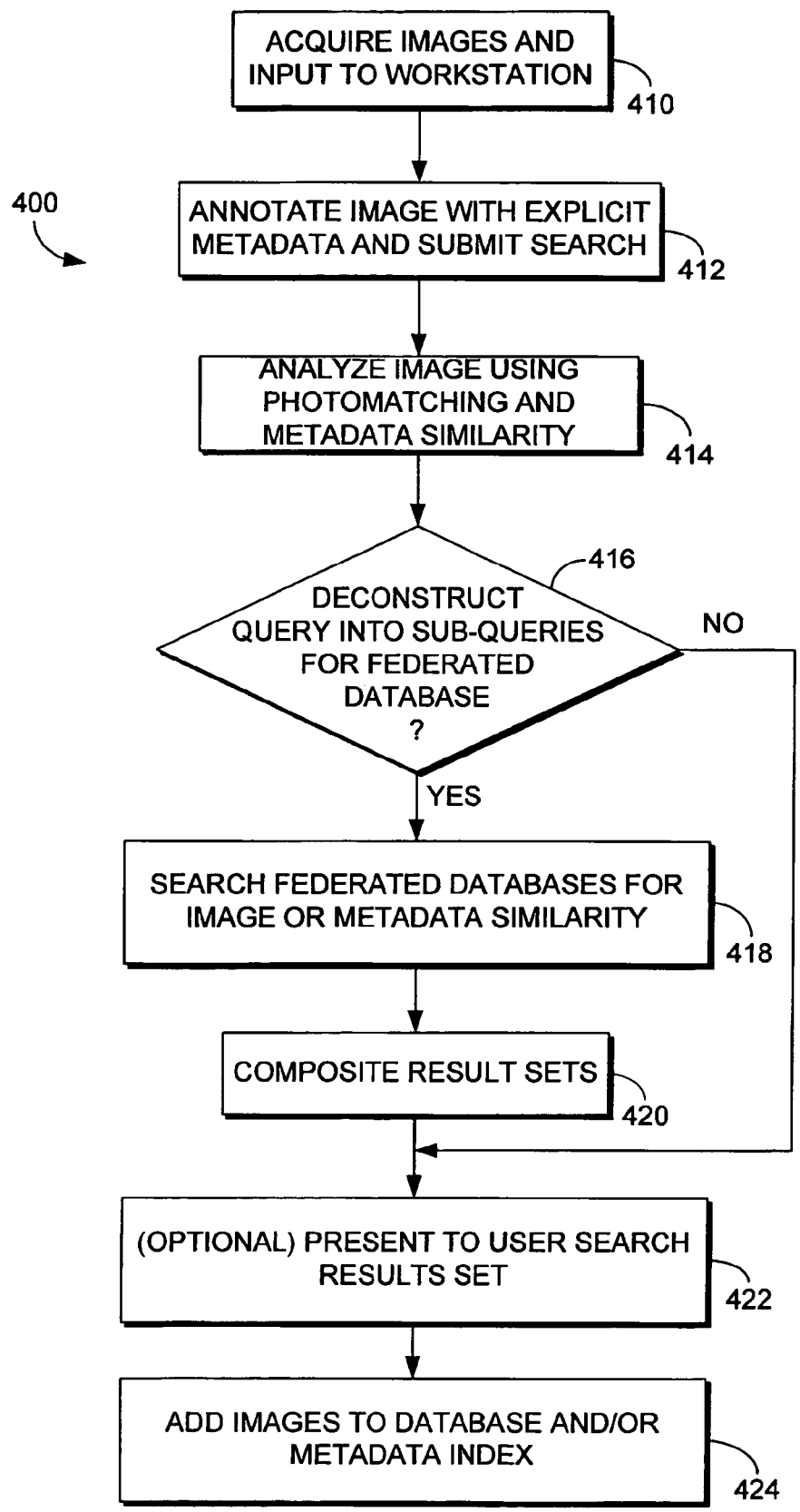
FIG. 4 is a process flow chart illustrating the operation of the query system of FIG. 1.

The flow chart of FIG. 4 illustrates a method 400 for the implementation of the visual query system of FIGS. 1 and 3. At step 410, the user acquires an image through either a camera or camera phone or selects an image and stores the image in the memory of workstation 110. At step 412, the query system enables the user to annotate the image with textual or audio data to further enhance the search and submit the search to the application server for browsing and retrieval of pertinent information. As an example, the image query may be a picture of the Eiffel Tower. The explicit metadata, i.e., the annotated text, states the following: Eiffel Tower, Paris, France, and New Years Day. The implicit data includes the time and date stamp and the GPS coordinates for the camera as the picture was taken.

The query system, at step 414, analyzes the image query using photomatching technology and further parse the metadata for metadata similarity. The system 10 may incorporate a federated database system. The constituent databases are interconnected via computer network, and may be geographically decentralized. For example, system 10 may use the parsed metadata to create subqueries for other databases such as online encyclopedias or mapping services, or otherwise use the sub-queries to identify sponsored advertisements directed to the location or item used in the image query. To this end, system 10, at step 416, may deconstruct the query into subqueries for submission, at step 418, to the relevant constituent database management systems. System 10 composites the result sets of the queries from both repository 248 and other federated databases at step 420, and provides a search set to the user at step 422. The system thus has a uniform front-end user interface, enabling users to store and retrieve data in multiple databases with a single query—even if the constituent databases are heterogeneous.

System 10 may elect to store the image, at step 424, of the query image in the database 248 using the implicit and explicit metadata to categorize the data. Further, the annotated material that is attached to the picture will be queryable, browseable and retrievable such that as the image is incorporated in a database, the implicit and explicit data will be useful in locating this image upon a relevant query. For example, if the annotated material, such as the GPS location of a photograph is added to the digital photograph, a query by image for an object at the same geocode location would result in a match for the search.

As an example of the system 10, if a number of photographers sent captioned images relating to an event, the system could search for all of the photographs submitted on that certain event and return an image collection for the search.

It is to be understood that the specific embodiment of the present invention that are described herein is merely illustrative of certain applications of the principles of the present invention. It will be appreciated that, although an exemplary embodiment of the present invention has been described in detail for purposes of illustration, various modifications may be made without departing from the spirit and scope of the invention. Therefore, the invention is not to be limited except as by the appended claims.

What is claimed is:

1. A method for searching a database through an image query, comprising the steps of:

inputting a digital image stored in a file to a first workstation having a data entry device, wherein implicit data associated with the image is stored in the same file as the image, and wherein the implicit data is permanent, non-modifiable information that is attached into the image as electronic pixels selected in a pattern that displays the implicit data in a manner that contrasts with the image;

annotating explicitly said image with explicit data using the data entry device to thereby produce an annotated image wherein explicit data is at least a factual description of the image;

searching the database of candidate images with the annotated image, wherein searching the database comprises comparing the image to candidate images in the database using photomatching technology, comparing implicit data associated with the image to implicit data associated with the candidate images in the database, and comparing explicit data associated with the image to explicit data associated with the candidate images in the database;

searching one or more online encyclopedias and one or more mapping services with the implicit and explicit data stored in the file with the annotated image; and generating a result set including one or more records wherein the one or more records are ranked according to a ranking criteria.

2. The method of claim 1, further including the step of capturing the image with a camera.

3. The method in accordance with claim 2, wherein said implicit data includes a geocode location for the image.

4. The method of claim 1, wherein the step of annotating explicitly said image with explicit data comprises annotating the image with audio data.

5. An image retrieval system comprising:
a workstation comprising a digital image stored in the workstation, wherein implicit data associated with the image is stored in the same file as the image, wherein the implicit data is permanent, non-modifiable information that is attached into the image as electronic pixels selected in a pattern that displays the implicit data in a manner that contrasts with the image, and wherein the implicit data includes a geocode location for the image;
entry means for annotating the image with explicit data to create a query image, wherein explicit data is at least a factual description of the image, and wherein the implicit data associated with the image is also associated with the query image;
a database of candidate images with explicit data;
image comparison means for comparing the query image with the candidate images using photomatching technology establish respective image similarities between the query image and the respective candidate images;
metadata comparison means for comparing the implicit data of the query image to the implicit data of the candidate images;
metadata comparison means for comparing the explicit data of the query image to the explicit data of the candidate images;
subquery means for parsing the implicit and explicit data of the query image to create subqueries that identify sponsored advertisements directed to a location or item associated with the query image; and
presentation means for presenting at least a candidate image with a largest image and data similarity based on a ranking criteria and one or more identified sponsored advertisements.

6. The system of claim 5, wherein the entry means is a data tag application.

7. The system of claim 5, wherein annotating the image with explicit data comprises annotating the image with audio data.

8. One or more computer-readable storage media having computer useable instructions stored thereon for implementing a content and metadata based image query, comprising:
a first set of instruction codes for annotating a digital image with explicit metadata, wherein explicit metadata is at least a factual description of the image, wherein implicit data associated with the image is stored in the same file as the image, and wherein the implicit data is permanent, non-modifiable information that is attached into the image as electronic pixels selected in a pattern that displays the implicit data in a manner that contrasts with the image;
a second set of instruction codes for comparing the annotated image with a candidate image from a database of candidate images by using photomatching technology, comparing the implicit data associated with the candidate image, and comparing the explicit metadata of the annotated image with explicit data associated with the candidate image,
wherein after comparing the annotated image with a candidate image, the annotated image is added to the database of candidate images;
a third set of instruction codes for parsing the implicit and explicit data of the annotated image to create subqueries, using the subqueries to search one or more online encyclopedias and one or more mapping services, and identifying sponsored advertisements directed to a location or item associated with the annotated image; and
a fourth set of instruction codes for implementing a ranking criteria to display one or more candidate images with relevant results.

9. The media of claim 8, wherein annotating the image with explicit metadata comprises annotating the image with audio data.

10. The method of claim 1, further comprising after searching the database of candidate images with the annotated images, adding the annotated image to the database of candidate images.

* * * * *